US006658210B1

(12) United States Patent
Fee

(10) Patent No.: US 6,658,210 B1
(45) Date of Patent: Dec. 2, 2003

(54) INTERLEAVED BIDIRECTIONAL WDM CHANNEL PLAN

(75) Inventor: John A. Fee, Richardson, TX (US)

(73) Assignee: WorldCom, Inc., Ashburn, VA (US)

( * ) Notice: Subject to any disclaimer, the term of this patent is extended or adjusted under 35 U.S.C. 154(b) by 0 days.

(21) Appl. No.: 09/327,039

(22) Filed: Jun. 4, 1999

(51) Int. Cl.[7] .......................... H04B 10/08; H04J 14/02; H04K 3/00
(52) U.S. Cl. ............................. 398/79; 398/34; 398/91; 398/39
(58) Field of Search .................................. 359/114, 124, 359/133; 398/41, 79, 91, 34, 39

(56) References Cited

U.S. PATENT DOCUMENTS

| 5,452,124 A | * | 9/1995 | Baker ........................ 359/341 |
| 5,504,608 A | * | 4/1996 | Neeves et al. ............... 250/226 |
| 5,600,467 A | * | 2/1997 | Fee ............................ 359/124 |
| 6,018,404 A | * | 1/2000 | Meli et al. ..................... 398/1 |
| 6,081,368 A | * | 6/2000 | Delavaux .................... 359/341 |
| 6,111,675 A | * | 8/2000 | Mao et al. ................... 359/124 |
| 6,137,604 A | * | 10/2000 | Bergano ...................... 359/124 |
| 6,160,660 A | * | 12/2000 | Aina et al. ................... 359/124 |

OTHER PUBLICATIONS

Merriam Webster's, Collegiate' Dictionary, 10th ed., p. 114, 1997.*
Liu et al, Array Processing for Slow FHMA and Hybrid FH/TDMA with Overlap Channel Transmission, IEEE, 1997, pp 394–398.*

* cited by examiner

Primary Examiner—Leslie Pascal
Assistant Examiner—Dalzid Singh

(57) ABSTRACT

A bidirectional optical link has a plurality of wavelengths to carry information in first and second differing transmission directions to optimize system performance. First and second sets of wavelengths of the plurality of wavelengths are determined wherein the wavelengths of the first set alternate with the wavelengths of the second set. Transmitting is performed in the first transmission direction by way of the first set of wavelengths and in the second transmission direction by way of the second set of wavelengths whereby the transmission directions of adjacent wavelengths of the plurality of wavelengths differ. The wavelengths of the plurality of wavelengths are wavelength division multiplexed within the optical link and the wavelengths transmitted in the same direction are multiplexed with each other. The wavelengths of the plurality of wavelengths can be substantially evenly spaced apart from each other or adjacent wavelengths transmitted in different directions may overlap. The wavelengths of the first set of wavelengths and the wavelengths of the second set of wavelengths are transmitted by way of a single optical fiber. The single optical fiber is provided with a bidirectional amplifier. Selected wavelengths of the plurality of wavelengths can be moved during the transmitting of the plurality of wavelengths in order to avoid interference.

15 Claims, 3 Drawing Sheets

INTERLEAVED BIDIRECTIONAL WDM CHANNEL PLAN

FIELD OF THE INVENTION

This invention relates to the field of optical communication systems and, in particular, to the field of bidirectional optical communication links within such systems wherein a single optical communication link transmits a plurality of carrier wavelengths.

BACKGROUND OF INVENTION

Optical networks having a plurality of optical transmission lines permit high bandwidth data communications. In optical data networks high speed data is modulated on light waves that are transmitted through the optical links of the data network. Optical transmission links or lines of this type can be used in telephone systems and various other types of data communication systems. Further bandwidth improvement can be achieved in an optical network by modulating different electrical data signals on distinct light wave carriers wherein each light wave carrier has a different wavelength. This technique is known as wavelength division multiplexing (WDM). Optical systems using WDM therefore require a plurality of optical transmitters and optical receivers operating at different light frequencies.

When several light wave carriers operate within the same optical fiber, as in the case of WDM, unwanted interference signals can sometimes be formed in the available optical band of the fiber. For example, second harmonic distortion can produce sums of differences of the traveling wavelengths that can tend to lie outside the band of interest. However, third harmonic distortion can be within the band of interest and therefore have an interfering effect on the carrier spectrum. Interference of modulated signals with each other in this manner is referred to as crosstalk.

Several techniques are known in the prior art for minimizing the crosstalk between modulated signals within optical fibers. For example, it is known to select the transmission frequencies of modulated signals within an optical fiber such that the possible interference frequencies of the modulated signals do not fall within the transmission bands of other modulated signals within the fiber. Additionally, it is known to restrict the modulation bandwidths of an optical fiber in order to minimize crosstalk. Furthermore, it is known to provide guard bands between adjacent wavelengths of an optical fiber. However, each of these techniques is hindered by the limited selectivity and stability of the optical filters required for implementation.

Therefore, it is desirable to provide an improved system and method for optimizing system performance within optical fibers transmitting modulated wavelengths that overcomes the drawbacks of the prior art methods.

SUMMARY OF THE PRESENT INVENTION

The present invention is a system and method for communicating information within a bidirectional optical link having a plurality of wavelengths that transmits information in a first direction receiving information and from a second differing direction. First and second sets of wavelengths of the plurality of sequential wavelengths are determined wherein the wavelengths of the first set alternate with the wavelengths of the second set. The first set of wavelengths is transmitted in a first direction and the second set of wavelengths is transmitted in a second direction such that the propagation directions of adjacent wavelengths differ from each other.

DETAILED DESCRIPTION OF THE INVENTION

Figure 1:
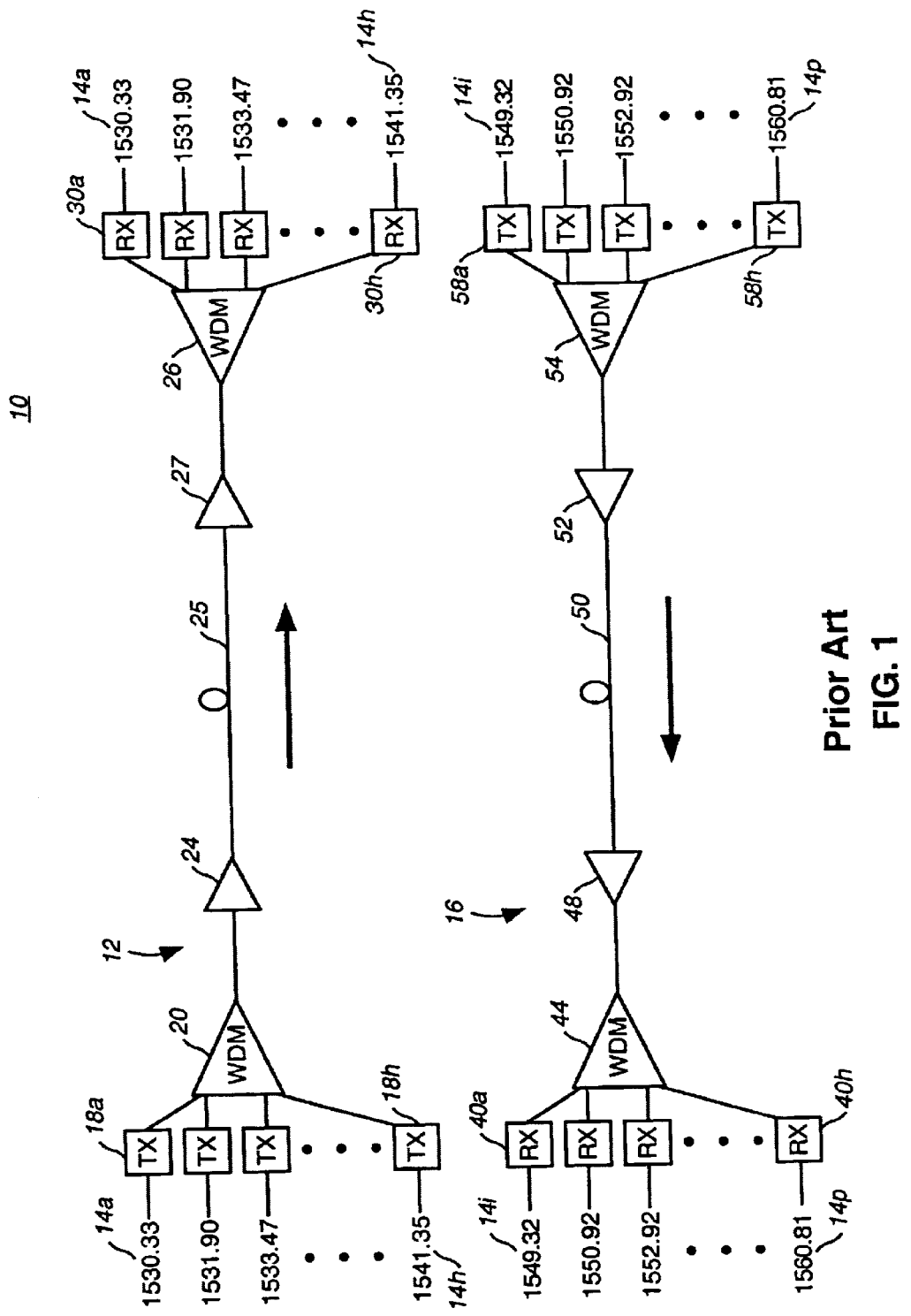
FIG. 1 shows a schematic representation of a prior art unidirectional wavelength division multiplexing channel plan for optical communication.

Referring now to FIG. 1, there is shown prior art unidirectional channel plan 10. Unidirectional channel plan 10 is a 16-wavelength channel plan wherein the first eight wavelengths of the channel plan are used for transmission in one direction and the second eight wavelengths are used for transmission in the opposite direction. It is known in the art of optical communication systems to provide 2-, 4-, and 8-wavelength channel plans as well as 16-wavelength channel plans such as unidirectional channel plan 10.

Unidirectional channel plan 10 operates upon both 8-wavelength optical communication system 12 and 8-wavelength optical communication system 16. Optical communication systems 12, 16 are separate communication systems that can each transmit eight modulated wavelengths in one of two opposite directions and can be combined to form channel plan 10.

Within 8-wavelength optical communication system 12 of channel plan 10 sequential optical wavelengths 14a–h are applied to individual optical transmitters 18a–h to provide transmit wavelengths 14a–h for transmission in the same direction through an optical link. Each transmit wavelength 14a–h of communication system 12 has a unique wavelength. In one embodiment of communication system 12 the sequential wavelengths of transmit wavelengths 14a–p can be separated from each other by approximately 1.57 nanometers. For example, transmit wavelength 14a can be 1530.30 nanometers, transmit wavelength 14b can be 1531.90 nanometers, and transmit wavelength 14c can be 1533.47 nanometers, etc.

Transmit wavelengths 14a–h are applied by optical transmitters 18a–h to WDM multiplexer 20 where they are WDM multiplexed. The multiplexed signal at the output of WDM multiplexer 20 is amplified by amplifier 24 and transmitted by way of optical fiber 25. The signal transmitted by way of optical fiber 25 within 8-wavelength optical communication system 12 is received and amplified by amplifier 27. The amplified signal at the output of amplifier 27 is applied to WDM demultiplexer 26 where it is demultiplexed.

WDM demultiplexer 26 separates the amplified signal of amplifier 27 into eight demultiplexed signals. Each of the eight demultiplexed signals from WDM demultiplexer 26 is applied to an individual optical receiver 30a–h. Optical receivers 30a–h receive the demultiplexed signals and provide received wavelengths 14a–h. The wavelengths of the eight received wavelengths 14a–h provided at optical receivers 30a–h correspond to the wavelengths of the eight transmit wavelengths 14a–h at the opposite end of channel plan 10.

Within 8-wavelength optical communication system 16 of channel plan 10, sequential optical wavelengths 14i–p are applied to individual optical transmitters 58a–h to provide transmit wavelengths 14i–p for transmission in the direction opposite to the direction of transmit wavelengths 14a–h. Transmit wavelengths 14i–p have unique wavelengths that can be separated from each other by approximately 1.57 nanometers. Optical transmitters 58a–h apply transmit wavelengths 14i–p to WDM multiplexer 54 where they are WDM multiplexed. The multiplexed signal at the output of WDM multiplexer 54 is amplified by amplifier 52 and transmitted by way of optical fiber 50.

The signal transmitted by way of optical fiber 50 within optical communication system 16 is received and amplified by amplifier 48. The amplified signal at the output of amplifier 48 is applied to WDM demultiplexer 44 for WDM demultiplexing. Each of the demultiplexed signals from demultiplexer 44 is applied to an individual optical receiver 40a–h. Optical receivers 40a–h provide received wavelengths 14i–p. The eight received wavelengths 14i–p at the outputs of optical receivers 40a–h correspond to the eight transmit wavelengths 14i–p at the opposite end of unidirectional channel plan 10.

It will be understood by those skilled in the art that prior art unidirectional channel plans such as channel plan 10 can provide satisfactory results with respect to transmitting a plurality of optical signals through an optical link. However, it will also be understood that the required use of a second unidirectional communication system in order to obtain bidirectional communication results in substantial inefficiency in channel plans such as channel plan 10.

Figure 2:
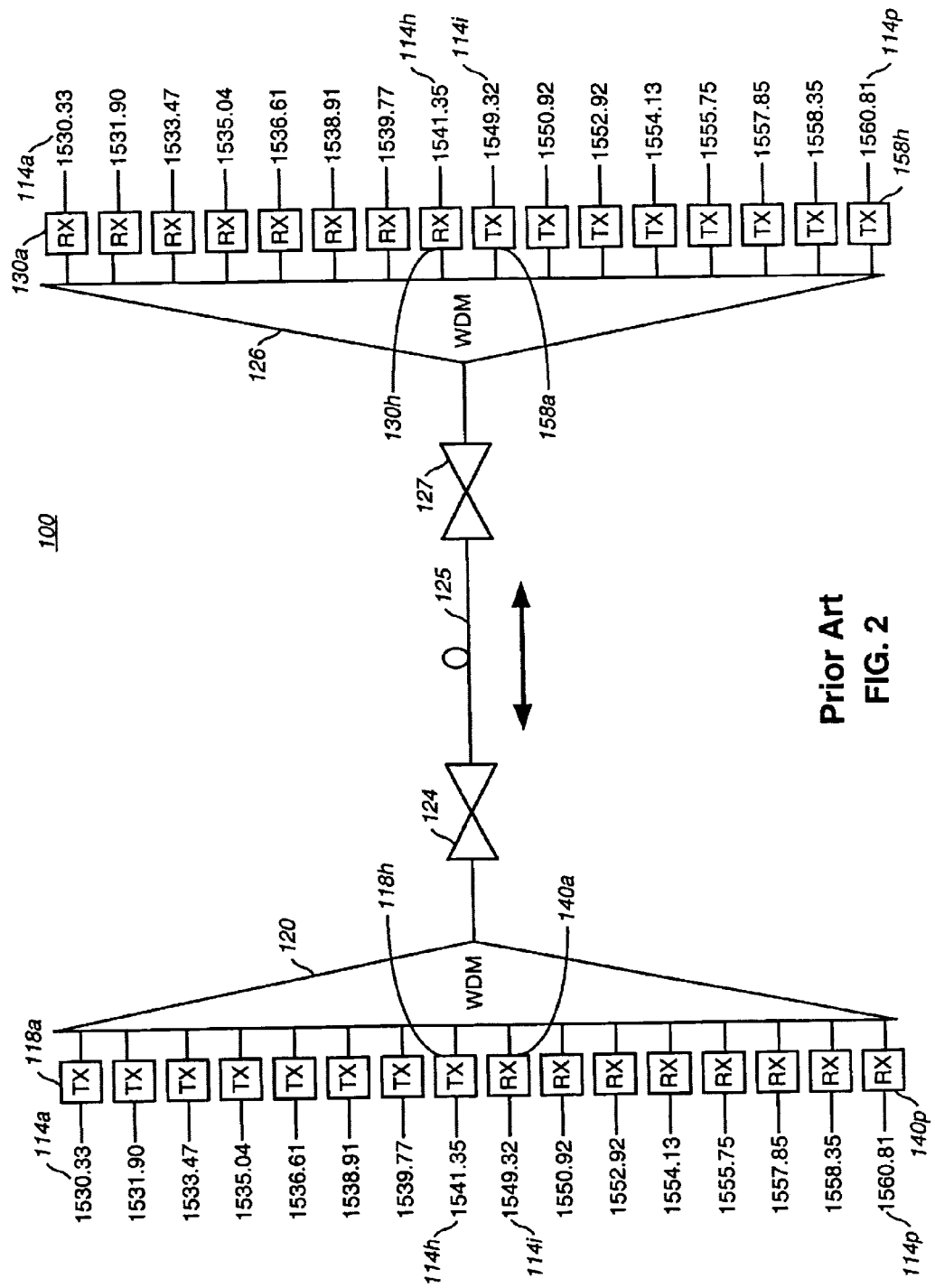
FIG. 2 shows a schematic representation of a prior art bidirectional wavelength division multiplexing channel plan for optical communication.

Referring now to FIG. 2, there is shown prior art bidirectional channel plan 100 having sequential optical wavelengths 114a–p. Bidirectional channel plan 100 is thus a 16-wavelength channel plan. The sequential wavelengths of optical wavelengths 114a–p within bidirectional channel plan 100 are unique. Adjacent sequential wavelengths 114a–p can be separated from each other by approximately 1.57 nanometers in one possible embodiment of channel plan 100.

Within 16-wavelength bidirectional channel plan 100 the first eight sequential optical wavelengths 114a–h are applied to optical transmitters 118a–h to provide transmit wavelengths 114a–h for transmission in the same direction as each other. Transmit wavelengths 114a–h are applied by optical transmitters 118a–h to WDM multiplexer/demultiplexer 120 where they are WDM multiplexed. The multiplexed signal at the output of WDM multiplexer/demultiplexer 120 is amplified by bidirectional amplifier 124. The amplified output signal of bidirectional amplifier 124 is transmitted by way of optical fiber 1within channel plan 100.

The output signal of amplifier 124 transmitted by way of optical fiber 125 is received and amplified by bidirectional amplifier 127. The amplified output of bidirectional amplifier 127 is applied to WDM multiplexer/demultiplexer 126 to be demultiplexed. WDM multiplexer/demultiplexer 126 separates the amplified signal into eight demultiplexed signals. Each of the eight demultiplexed signals from WDM multiplexer/demultiplexer 126 is applied to an individual optical receiver 130a–h. Optical receivers 130a–h receive the demultiplexed signals and provide received wavelengths 114a–h. The eight received wavelengths 114a–h at the output of optical receivers 130a–h correspond to the eight transmit wavelengths 114a–h applied to optical transmitters 118a–h at the opposite end of channel plan 100.

Also within bidirectional channel plan 100, the next eight sequential optical wavelengths 114i–p are applied to individual optical transmitters 158a–h. Optical transmitters 158a–h thus provide transmit wavelengths 114i–p for transmission through channel plan 100 in the direction opposite to the direction of transmit wavelengths 114a–h. The outputs of optical transmitters 158a–h are applied to WDM multiplexer/demultiplexer 126 where they are WDM multiplexed. The multiplexed signal at the output of WDM multiplexer/demultiplexer 126 is received and amplified by bidirectional amplifier 127. The amplified signal at the output of bidirectional amplifier 127 is transmitted by way of optical fiber 125.

The signal from bidirectional amplifier 127 is received and amplified by bidirectional amplifier 124. The amplified signal at the output of bidirectional amplifier 124 is applied to WDM multiplexer/demultiplexer 120 for WDM demultiplexing into eight demultiplexed signals. Each of the eight demultiplexed signals from WDM multiplexer/demultiplexer 120 is applied to an individual optical receiver 140a–h. Optical receivers 140a–h provide received wavelengths 114i–p. The eight received wavelengths 114i–p at the outputs of optical receivers 140a–h correspond to the eight transmit wavelengths 114i–p.

Both prior art channel plans 10, 100 are subject to interference between the various modulated optical wavelengths transmitted during the communication process. For example, both prior art channel plans 10, 100 can have nonlinear crosstalk and four wave mixing because of the narrow spacing between the wavelengths. Furthermore, in channel plans 10, 100 the combination of the two wavelengths $(2\lambda-\lambda)$ in the same transmission direction can cross over between channels and interfere with another wavelength in an adjacent channel with a wavelength traveling in the same direction.

Figure 3:
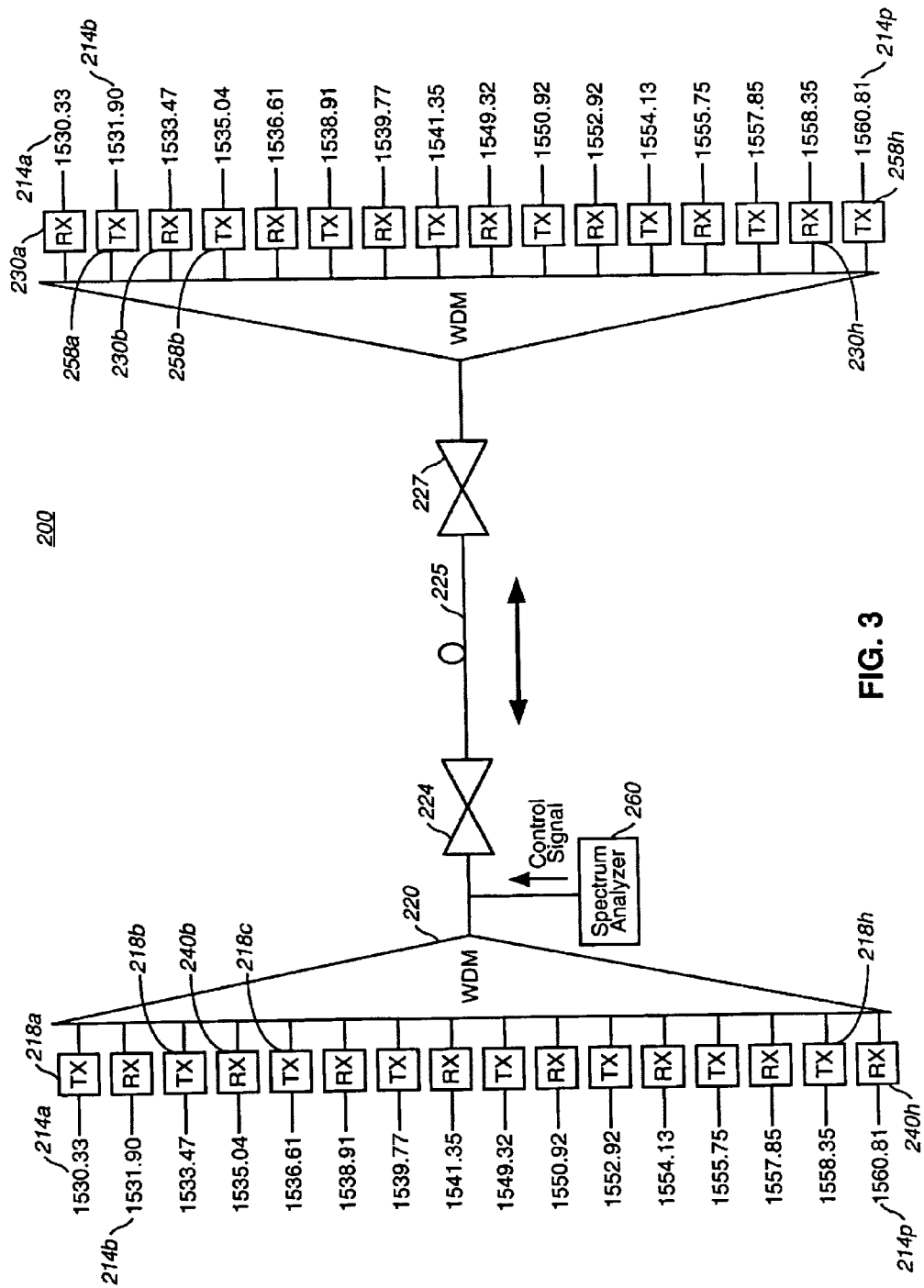
FIG. 3 shows a schematic representation of the bidirectional wavelength division multiplexing channel plan of the present invention.

Referring now to FIG. 3, there is shown bidirectional channel plan 200 of the present invention. Bidirectional channel plan 200 has sixteen optical wavelengths 214a–p and is thus a 16-wavelength channel plan. It is adapted to provide transmission of eight wavelengths in each of two differing directions. While the system and method of the present invention is thus described with respect to a 16-wavelength channel plan for illustrative purposes, it will be understood that the present invention can be advantageously applied to channel plans of any size. Also, in this embodiment the channels have sequential optical wavelengths, however, the channel wavelengths need not be sequential, e.g., there may be a gap in wavelengths between channels. Alternately, if capacity is an issue, adjacent channels may have overlapping wavelengths.

The optimization in system performance within bidirectional channel plan 200 of the present invention is accomplished by alternating the transmission directions of adjacent optical wavelengths 214a–p available within the optical link. For example, in the case wherein optical wavelengths 214a,b,c are sequential, optical wavelength 214a can be used as a transmit wavelength at one end of the optical link. At the same end of the optical link, optical wavelength 214b can be received by an optical detector. Optical wavelengths 214a,b, adjacent to each other, are transmitted in different directions. This helps to reduce unwanted interference within bidirectional channel plan 200.

The next optical wavelength in the sequence, optical wavelength 214c, can then be used as the next transmit wavelength at the same end of the optical link. The previously allocated wavelength that is adjacent to optical wavelength 214c is optical wavelength 214b. Since adjacent optical wavelength 214b is a received wavelength at this end of channel plan 200 while transmit wavelength 214c is a transmit wavelength, crosstalk between optical wavelengths 214b,c is also reduced.

If the optical wavelengths 214a–p within channel plan 200 are sequential and do not overlap, as in the embodiment in FIG. 3, the distance between any two wavelengths 214a–p transmitted in the same direction is never less than twice the distance between two adjacent wavelengths 214a–p. For example, the distance between the first two transmit wavelengths 214a,c in the example of channel plan 200 is approximately three nanometers rather than 1.57 nanometers. This makes the likelihood of cross phase modulation between transmit wavelengths 214a,c substantially lower. Furthermore, the combination of the two transmit wavelengths 214a,c, 1530.33 and 1533.47 nanometers, does not fall within the transmission channel range of channel plan 200.

In another embodiment, the optical wavelengths 214a–p within channel plan 200 may overlap. For example, each optical wavelength 214a–p may be positioned only 1 nanometer apart while having a bandwidth of 1.57 nanometers. Optical signal 214a has a 1.57 nanometer bandwidth and is transmitted at 1530.33 nanometer; optical signal 214b has a 1.57 nanometer bandwidth and is transmitted at 1531.33 nanometer; optical signal 214c has a 1.57 nanometer bandwidth and is transmitted at 1532.33 nanometer, etc. As a result, Two wavelengths transmitted in the same direction, such as 214a, 214c, are separated by 0.44 nanometer while adjacent wavelengths 214a, 214b overlap by 0.56 nanometer. This emodiment increases the optical capacity at the expense of increasing possibility of interference.

Referring to FIG. 3, the system of the present invention is now described in further detail. If minimizing interference is the main priority, then the optical wavelengths 214a–p may be positioned further apart. For example, if the bandwidth of the optical signals is 1.57 nanometers, the optical wavelengths may be positioned 2 nanometers apart at 1530.33 nanometers, 1532.33 nanometers, 1534.33 nanometers, etc.

At one end of 16-wavelength bidirectional channel plan 200, a set of optical wavelengths 214a,c,e,g,i,k,m,o is applied to optical transmitters 218a–h for transmission in the same direction as each other. The outputs of optical transmitters 218a–h are applied to WDM multiplexer/demultiplexer 220 where they are WDM multiplexed. The resulting multiplexed signal is amplified by bidirectional amplifier 224 and transmitted through channel plan 200 by way of optical fiber 225.

The multiplexed signal transmitted by way of optical fiber 225 is amplified by bidirectional amplifier 227 and applied to WDM multiplexer/demultiplexer 226. WDM multiplexer/demultiplexer 226 separates the amplified signal into eight demultiplexed signals that are applied to individual optical receivers 230a–h. Optical receivers 230a–h provide received wavelengths 214a,c,e,g,i,k,m,o. The eight received signals at the output of optical receiver 230a–h correspond to the eight transmit signals of optical transmitters 218a–h.

Also within bidirectional channel plan 200, a second set of optical wavelengths 214b,d,f,h,j,l,n,p is applied to optical transmitters 258a–h for transmission in the direction opposite to the direction of transmit wavelengths 214a,c,e,g,i,k,m,o. The outputs of optical transmitters 258a–h are applied to WDM multiplexer/demultiplexer 226 where they are WDM multiplexed. The multiplexed signal is amplified by bidirectional amplifier 227 and transmitted by way of optical fiber 225.

The signal from bidirectional amplifier 227 is received and amplified by bidirectional amplifier 224. The amplified signal at the output of bidirectional amplifier 224 is applied to WDM multiplexer/demultiplexer 220 for WDM demultiplexing. The demultiplexed signals from WDM multiplexer/demultiplexer 220 are applied to optical receivers 240a–h. Optical receivers 240a–hprovide received wavelengths 214b,d,f,h,j,l,n,p. The eight signals at the outputs of optical receivers 240a–h correspond to the eight transmit wavelengths 214b,d,f,h,j,l,n,p.

The system and method of the present invention can be advantageously combined with many other communication methods. For example, it can be combined with communication methods wherein the channels of an optical link are moved during transmission of a plurality of predetermined wavelengths therethrough in order to reduce harmonic interference. This method is taught in U.S. Pat. No. 5,600,467, entitled, "Method And Apparatus For Reducing Harmonic Interference On Multiplexed Optical Communication Lines," issued to John A. Fee, on Feb. 4, 1997, which is incorporated by reference herein.

In the method taught by Fee the content of the spectrum of the wavelengths within an optical link is examined using a wave analyzer or a spectrum analyzer 260 in order to derive a representation of the optical activity within the link. The measured spectrum is compared with the desired spectrum of the predetermined wavelengths of the link. If an unwanted interfering wavelength is detected within the spectrum a detect signal is provided. When the detect signal is determined to be present the locations of the predetermined wavelengths within the link can be recalculated in order to prevent any of the predetermined wavelengths from coinciding with the unwanted wavelength. It will be understood that the predetermined wavelengths of the analyzed spectrum in the method taught by Fee can carry signals transmitted in alternating directions in accordance with the system and method of the present invention.

While the present invention has been described in terms of the preferred embodiments, for example, for specific numbers of optical carriers at specific wavelengths, it should be evident to those skilled in the art that variations of the preferred embodiments can be practiced without departing from the scope of the invention. The invention should only be restricted as defined in the appended claims.

What is claimed is:

1. A method for communicating information within a bidirectional optical link having a plurality of wavelengths comprising first and second sets of wavelengths, the method comprising the steps of:

transmitting the first set of wavelengths in a first transmission direction;

transmitting the second set of wavelengths in a second transmission direction, adjacent wavelengths of the plurality of wavelengths being transmitted in different directions, wherein the wavelengths are spaced apart from each other by approximately 1.57 nanometers;

determining which of said plurality of wavelengths are involved in harmonic interference; and shifting selected wavelengths of the plurality of wavelengths during the transmission to minimize the harmonic interference.

2. The communication method of claim 1, wherein the wavelengths of the plurality of wavelengths are wavelength division multiplexed within the optical link.

3. The communication method of claim 2, wherein the wavelengths transmitted in the same direction are multiplexed with each other.

4. The communication method of claim 1, wherein the wavelengths of the first set of wavelengths and the wavelengths of the second set of wavelengths are transmitted by way of a single optical fiber.

5. The communication method of claim 4, wherein the single optical fiber is provided with a bidirectional amplifier.

6. A system for communicating information along a bidirectional optical link having a plurality of sequential wavelengths in a first and second differing transmission directions, comprising:

at least one wavelength division multiplexer (WDM) for outputting signals having first and second sequential sets of wavelengths, the respective wavelengths of said first set alternating with the respective wavelengths of said second set, said first set of wavelengths being transmitted in said first direction and said second set of wavelengths being transmitted in said second direction so that the transmission directions of adjacent wavelengths differ from each other, and are spaced with overlapping bandwidths, wherein selected wavelengths of the plurality of sequential wavelengths are shifted during the transmitting of the plurality of sequential wavelengths in accordance with a determination of which of the plurality of wavelengths are involved in harmonic interference in order to minimize harmonic interference.

7. The system of claim 6, wherein said WDM comprises a multiplexer/demultiplexer for multiplexing the wavelengths of the plurality of sequential wavelengths within the optical link.

8. The system of claim 7, wherein said multiplexer/demultiplexer multiplexes the wavelengths transmitted in the same direction with each other.

9. The system of claim 6, wherein the wavelengths of the plurality of sequential wavelengths are substantially evenly spaced apart from each other.

10. The system of claim 6, wherein the wavelengths of the first set of wavelengths and the wavelengths of the second set of wavelengths are transmitted by way of a single optical fiber.

11. The system of claim 6, wherein the optical spectrum of the plurality of wavelengths is measured and the determination of which of the plurality of wavelengths are involved in harmonic interference is made, and a control signal is provided, in accordance with the measured spectrum.

12. The system of claim 11, wherein the selected wavelengths of the plurality of sequential wavelengths are shifted in accordance with the control signal.

13. A method for communicating information within a bidirectional optical link having a plurality of wavelengths comprising first and second sets of wavelengths, the method comprising the steps of:

transmitting the first set of wavelengths in a first transmission direction;

transmitting the second set of wavelengths in a second transmission direction, adjacent wavelengths of the plurality of wavelengths being transmitted in different directions and are spaced with overlapping bandwidths;

determining which of said plurality of wavelengths are involved in harmonic interference; and shifting selected wavelengths of the plurality of wavelengths during the transmission to minimize the harmonic interference.

14. The communication method of claim 13, comprising the step of measuring spectrum of the plurality of wavelengths and providing a control signal in accordance with the measured spectrum.

15. The communication method of claim 14, comprising the step of moving the selected wavelengths of the plurality of wavelengths in accordance with the control signal.

* * * * *